INVENTORS
OSCAR R. BUEHLER
GEORGE P. KEISTER
JOSEPH F. LONG

United States Patent Office 3,461,167
Patented Aug. 12, 1969

3,461,167
**PROCESS FOR MAKING HEXAMETHYLENE-
DIAMINE FROM ADIPONITRILE**
Oscar R. Buehler, George P. Keister, and Joseph F. Long, Victoria, Tex., assignors to E. I. du Pont de Nemours and Company, Wilmington, Del., a corporation of Delaware
Filed Sept. 19, 1967, Ser. No. 668,919
Int. Cl. C07c *85/12, 87/14*
U.S. Cl. 260—583    10 Claims

ABSTRACT OF THE DISCLOSURE

Hydrogenation of adiponitrile to hexamethylene-diamine in the presence of ammonia and hydrogenation catalyst is conducted in a plurality of reaction zones arranged in series, with the ammonia present in the first reaction zone of the series being passed serially to each subsequent reaction zone.

---

This invention relates to the manufacture of hexamethylenediamine and more particularly, an improved method wherein ammonia input relative to adiponitrile consumed is reduced and the yield of hexamethylenediamine is increased.

Hexamethylenediamine can be made by the well-known process of the catalytic hydrogenation of adiponitrile in the presence of ammonia. The higher the amount of ammonia present relative to adiponitrile feed, the lower are the amounts of undesirable by-products formed. An additional benefit is the heat sink effect of the ammonia on the exothermic hydrogenation reaction, with this benefit increasing as the relative amount of ammonia increases. Heretofore, manufactures have been unable to avail themselves to the full measure of these benefits, because as the proportion of ammonia increases, so do the costs of pumping and recovering the ammonia.

The present invention provides a method by which the amount of ammonia used, relative to adiponitrile consumed, can be reduced while still retaining the benefits of high proportions of ammonia. This is achieved by splitting up or apportioning the hydrogenation reaction among a plurality of reaction zones. These zones are arranged in series, however, so that the ammonia present in the first zone can be passed to the subsequent reaction zones.

Figure 1:
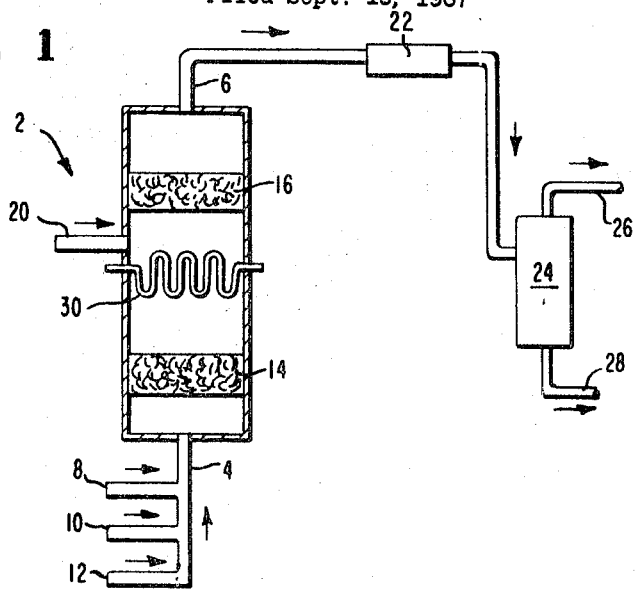
Figure 2:
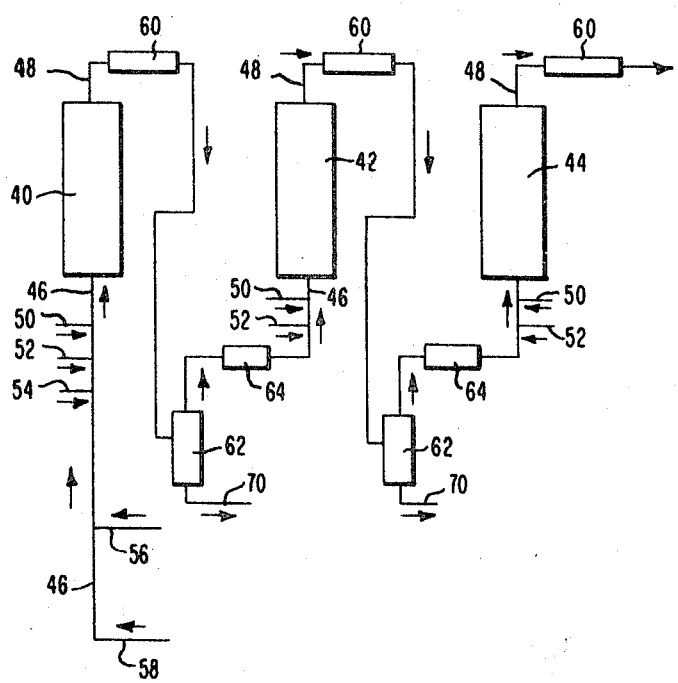

The invention will be more fully described hereinafter with reference to the drawings, in which:

FIG. 1 shows a reactor in side elevation and cross-section in a system for carrying out one embodiment of the present invention; and FIG. 2 shows schematically a system which is suitable for carrying out another embodiment of the present invention.

With reference to the drawings, FIG. 1 shows apparatus suitable for carrying out the process of this invention. In FIG. 1, a reactor 2 is provided with a bottom inlet 4 and a top outlet 6. Feed lines 8, 10 and 12 communicate with inlet 4 for feeding ammonia, hydrogen and adiponitrile, respectively, under pressure to the reactor. Contained within the reactor 2 are vertically spaced hydrogenation catalyst beds 14 and 16, each of which is permeable to the upward passage of ingredients fed through lines 8, 10 and 12 and reaction products therefrom. An additional feed line 20 for feeding additional adiponitrile to reactor 2 is provided between catalyst beds 14 and 16.

According to the process of this invention, the flow of materials, viz., unreacted feed ingredients and reaction products, is upward serially, through catalyst bed 14 which forms the first reaction zone and then through catalyst bed 16 which forms a second or subsequent reaction zone in the series. Adiponitrile added through line 20 mixes with the ingredients and products from catalyst bed 14 and flows into catalyst bed 16.

The reaction conditions are such in each reaction zone that the adiponitrile present therein is at least substantially converted to hexamethylenediamine. Thus, the hexamethylenediamine formed in the first reaction zone is passed through the second reaction zone. Unexpectedly, in so passing, this hexamethylenediamine does not appear to undergo any degradation.

Along with the hexamethylenediamine formed in the first reaction zone, the unreacted hydrogen and ammonia, which is not a reactant, from the first reaction zone pass to the second reaction zone, wherein the hydrogenation of adiponitrile added through line 20 occurs.

Generally, the weight of ammonia present in the first reaction zone is greater than the weight of adiponitrile present therein. Since this adiponitrile is at least substantially converted to hexamethylenediamine in passing through the first reaction zone, additional adiponitrile can be added (through line 20) to the subsequent reaction zone without upsetting the ammonia balance desired for the second reaction zone.

The reaction mixture can be cooled, as desired, between reaction zones such as by passing the mixture through a cooling coil 30 positioned within the reactor 2. Further cooling can be applied to the reaction zones by such means as a cooling jacket (not shown) for the reactor and/or cooling tubes (not shown) positioned within the catalyst beds 14 and 16.

Exiting the reactor by way of outlet 6 is a mixture of ammonia, unreacted hydrogen, hexamethylenediamine formed from both reaction zones, and by-products, both useful and waste. These ingredients are passed through a cooler 22 and then to a liquid-gas separator 24 which is provided with line 26, containing primarily gaseous ingredients, mostly hydrogen and ammonia, and line 28, containing primarily liquid ingredients, mostly hexamethylenediamine.

The benefit of apportioning the catalytic hydrogenation of adiponitrile, in terms of ammonia usage, among more than one reaction zone can be seen by assigning certain feed and recovery values to a single reaction zone system and then to the system of FIG. 1. For a single zone system having an input of adiponitrile of 10 lb./hr., and in which a 4:1 weight ratio of ammonia to adiponitrile is desired, the feed rate of ammonia to the single zone would be 40 lb./hr. Thus, 40 lb. of ammonia must be pumped and recovered for each 10 lb. of adiponitrile consumed in the system.

For the same adiponitrile input for the system of FIG. 1, the adiponitrile feed can be divided into 5 lb./hr. through line 12 and 5 lb./hr. through line 20. To get the same 4:1 ammonia to adiponitrile ratio in the first reaction zone, only 20 lb./hr. of ammonia would be fed through line 8. Since the ammonia is not a reactant, all of the 20 lb./hr. of ammonia so fed is present in the second reaction zone. The 4:1 ammonia to adiponitrile ratio is obtained in the second reaction zone because the 5 lb./hr. of adiponitrile fed to the first reaction zone is converted to hexamethylenediamine.

Thus, instead of 40 lb. of ammonia being required per 10 lb. of adiponitrile consumed, as in the single reaction zone system, the dual reaction system of FIG. 1 requires only 20 lb. of ammonia per 10 lb. of adiponitrile consumed.

This savings in ammonia use increases as the number of apportionments of the hydrogenation reaction increases. For example, at an adiponitrile input of 10 lb./hr. for a four reaction zone system, the adiponitrile feed into each zone needs only to be about 2.5 lb./hr. In this instance, the ammonia fed to the first reaction zone (which is passed serially to the subsequent zones) is only about 10 lb./hr.

Instead of considering this invention in terms of savings in the reduced use of ammonia, the benefit can also be considered in terms of increasing the production capacity of hexamethylene diamine for the same level of ammonia used in a single reaction zone system.

Another system for carrying out the process and obtaining the benfits of this invention is shown in FIG. 2, wherein three reactors 40, 42 and 44 are used, each containing a single hydrogenation catalyst bed (not shown), to form three reaction zones. Each reactor is provided with an inlet line 46 and an outlet line 48. Communicating with each inlet line are feed lines 50 and 52 for adiponitrile and hydrogen, respectively. The inlet line for reactor 40 has an additional feed line 54 for ammonia. This particular inlet line also communicates with recycle lines 56 and 58 for purposes to be hereinafter explained.

The outlet line 48 of reactors 40 and 42 each communicate serially with a cooler 60 cooling the reactor effluent to the temperature desired for liquid-gas separation, a liquid-gas separator 62, and another cooler 64 cooling the gaseous fraction to approximately the feed temperature desired for the next reactor. The outlet line of reactor 40 then communicates with the inlet line 46 of reactor 42, and the same occurs for the outlet line of reactor 42 and the inlet line of reactor 44. Each liquid-gas separator 62 has a bottom discharge line 70 for liquid hexamethylenediamine separated from the reaction mixture of the preceding reactor. The hexamethylenediamine from each line 70 is combined and subjected to refinement, as desired, by known procedures.

The gas product of the liquid-gas separators 62 succeeding reactors 40 and 42, consisting primarily of ammonia and some unreacted hydrogen from the preceding reactor, is supplied to the inlet lines 46 of their respective succeeding reactor.

The line 48 of reactor 44 communicates with a cooler 60 and then with known equipment (not shown) for recovering hexamethylenediamine and providing recycle ammonia to line 56 and recycle hydrogen through line 58.

The process of the present invention is conducted in the system of FIG. 2, e.g., by dividing the total amount of adiponitrile that is to be converted into hexamethylenediamine into three substantially equal feeds, one feed (line 50) to each reactor along with the amount of hydrogen desired for the hydrogenation reaction. Ammonia for the entire system is supplied through lines 46 and line 54 (make-up) in the amount to achieve the desired ammonia-adiponitrile ratio in reactor 40 and thus, substantially the same ratio in reactors 42 and 44. Because a minor loss of ammonia may occur with the interzone removal of hexamethylenediamine by separators 62, the ammonia-adiponitrile ratio in reactors 42 and 44 may successively decrease. To prevent these ratios from becoming too low, the ratio in the first reactor 40 can be made correspondingly higher and/or the minor amounts lost be made up with make-up feeds of ammonia to reactors 42 and 44.

The catalytic hydrogenation reaction converting adiponitrile to hexamethylenediamine in each reaction zone is conventional in every respect. Thus, the known catalysts, catalyst supports and catalyst shapes in the form of a fixed bed or in a slurry catalyst system, the known temperatures and pressures and the known proportions of reactants for this reaction are fully applicable to each reaction zone of the present invention. By way of brief summary of some of these known aspects, representative hydrogenation catalysts include Ni, Co, Cu, Zn, Pt, Pr, Rb, Re as free metals, oxides or salts. The reaction can occur by passing the reactants over or through the catalysts. Representative reaction temperatures in each zone include the range from 25° C. to 200° C., but preferably from 70 to 170° C. Representative pressures in each zone include from 25 to 10,000 p.s.i.g., preferably from 300 to 7000 p.s.i.g. The reactants may be fed separately to the reaction zone or pre-combined and then fed to the reaction zone. The amount of hydrogen present in each reaction zone is generally in excess of the amount stoichiometrically required to hydrogenate the adiponitrile. Additional ingredients, such as by-product suppressors or catalyst promoters can be present in each reaction zone.

The apportioning of the catalytic hydrogenation reaction means that the total amount of adiponitrile to be consumed in the series reactor system is divided into separate feeds into separate reaction zones of the system and the adiponitrile in each reaction zone is at least substantially converted to useful products, viz., hexamethylenediamine and epsilon-amino-capronitrile. The reaction can be about equally apportioned as described for FIG. 1 or can be unequally apportioned, i.e., different amounts of adiponitrile being fed to each reaction zone of the system. For example, about twice the amount of adiponitrile fed to one reaction zone can be fed to a different reaction zone of the series. Thus, for a two-zone system, one third of the adiponitrile can be fed to and reacted in one zone and the remaining two thirds can be fed to and reacted in the other zone. Unequal apportionment may be employed where different size reaction zones (reactors) are employed and/or where the reaction conditions in successive zones differ, e.g., different temperatures, catalysts, etc.

The degree of conversion from the reaction in each zone will generally be at least about 90% conversion of adiponitrile to useful products and most cases above 95%. However, the subsequent zone(s) can be used for completing the reaction begun in previous zones, as may be necessary when catalyst efficiency varies from zone to zone. This completion, however, is done at the expense of the capacity of the subsequent zone for converting "new" adiponitrile to hexamethylenediamine. Thus, it is generally desired to conduct the reaction in each zone to at least 75% conversion of adiponitrile to useful products, with the last reaction zone in the series providing the conversion necessary to get the yield of hexamethylenediamine desired.

The hydrogen reactant can be fed entirely to the first reaction zone or can be apportioned to the various reaction zones of the series along with the adiponitrile.

The amount of ammonia present in each reaction zone can be varied as desired. Generally, the weight ratio of ammonia to adiponitrile will be from 0.5:1 and 6:1. The amount of adiponitrile added to each subsequent reaction zone, taking into account ammonia loss resulting from hexamethylenediamine recovery operation between each zone, can be such that the ammonia to adiponitrile ratio is at least substantially the same at the start of the reaction in each zone.

At least two reaction zones are used under the practice of the present invention, with the maximum number, such as, but not limited to eight, depending on the economics of a particular system. Usually, from two to four reaction zones will achieve maximum benefit. Recovery of hexamethylenediamine between reaction zones and succeeding the last reaction zone can be carried out employing known recovery procedures, e.g., for example, the procedure set forth in Dutch patent application No. 6,600,260.

The reaction in each zone of a series is conducted and/or inter-zone cooling employed in such a way that the range of exit temperatures for the entire series of reaction zones is usually within about 50° C., i.e., the difference between the lowest exit temperature and the highest exit temperature is about 50° C. or less. Most often the range will be within about 20° C.

Examples of the process of the present invention are as follows:

Example 1

This reaction is conducted in a reactor system such as depicted in FIG. 2, except that two reactors are used instead of three, each containing reduced cobalt oxide as a catalyst, all the hydrogen is added to the first reactor, and hexamethylenediamine is not recovered between reactors. The feed to the first reactor consists of a large excess of hydrogen (300,000 s.c.f.h.), 3,000 lb./hr. of adiponitrile containing some recycled intermediates, such as epsilon-amino capronitrile, and 14,000 lb./hr. of ammonia, at an inlet temperature of 88° C. The pressure in the first reactor is 4900 p.s.i.g., and its outlet temperature is 135° C. The effluent from the first reactor is cooled sufficiently to get the same outlet temperature for the second reactor. This effluent together with 3,000 lb./hr. of adiponitrile are fed to the second reactor. The effluent from the second reactor is cooled and passed through a liquid-gas separator, with hexamethylenediamine being recovered from the liquid phase.

Example 2

Example 1 is repeated except that 4,000 lb./hr. adiponitrile and 16,000 lb./hr. of ammonia are fed to the first reactor (along with 300,000 s.c.f.h. of hydrogen). The inlet temperature to the first reactor is 92° C. and the exit temperature of each reactor is 150° C. The effluent from the first reactor is cooled to maintain this exit temperature, and 3800 lb./hr. of adiponitrile is injected into the second reactor.

In each of these examples, the amount of useless by-products produced is less than the amount of such products under like operating conditions using a single reactor. In addition, the temperature rise in each reactor is less than that encountered in like single stage operation.

What is claimed is:

1. In the catalytic hydrogenation of adiponitrile to hexamethylenediamine in the presence of ammonia, the improvement comprising apportioning this reaction to at least two reaction zones by dividing the total amount of adiponitrile to be consumed into separate feeds corresponding to the number of said reaction zones and feeding each separate feed to its respective reaction zone, each said reaction zone containing hydrogenation catalyst and hydrogen, and passing the ammonia present in the first reaction zone to the subsequent reaction zone.

2. The process of claim 1 including the step of cooling that portion of the reaction mixture obtained from said first reaction zone which enters said subsequent reaction zone.

3. The process of claim 2 wherein said cooling is sufficient to make the exit temperature of said subsequent reaction zone within about 50° C. of the exit temperature of said first reaction zone.

4. The process of claim 1 wherein the ammonia to adiponitrile weight ratio at the start of said reaction in each said reaction zones is substantially the same.

5. The process of claim 1 wherein the temperature and pressure in each reaction zone are from 25 to 200° C. and from 25 to 10,000 p.s.i.g. respectively.

6. The process of claim 5 wherein the ammonia to adiponitrile weight ratio in each reaction zone is from 0.5:1 to 6:1 and the amount of hydrogen present in each reaction zone is a stoichiometric excess.

7. The process of claim 6 wherein the temperature and pressure are from 70 to 170° C. and from 300 to 7000 p.s.i.g. respectively.

8. The process of claim 5 wherein the range of exit temperatures for the entire series of reaction zones is within about 50° C.

9. The process of claim 5 wherein the maximum number of reaction zones is four.

10. The process of claim 1 wherein the hydrogenation catalyst is in the form of a fixed bed in each reaction zone.

References Cited

UNITED STATES PATENTS 3,056,837   10/1962   Steeman.

CHARLES B. PARKER, Primary Examiner

R. L. RAYMOND, Assistant Examiner

U.S. Cl. X.R.

260—690